United States Patent
Kim

(10) Patent No.: US 11,097,771 B2
(45) Date of Patent: Aug. 24, 2021

(54) MOTOR-DRIVEN POWER STEERING APPARATUS AND CONTROL METHOD THEREOF

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 159 days.

(21) Appl. No.: 16/521,903

(22) Filed: Jul. 25, 2019

(65) Prior Publication Data

US 2020/0031386 A1 Jan. 30, 2020

(30) Foreign Application Priority Data

Jul. 26, 2018 (KR) .................. 10-2018-0087061

(51) Int. Cl.
*B62D 5/04* (2006.01)
*B62D 6/02* (2006.01)
*B62D 6/00* (2006.01)
*B62D 6/08* (2006.01)

(52) U.S. Cl.
CPC .......... *B62D 5/0463* (2013.01); *B62D 6/001* (2013.01); *B62D 6/02* (2013.01); *B62D 6/08* (2013.01)

(58) Field of Classification Search
None
See application file for complete search history.

(56) References Cited

U.S. PATENT DOCUMENTS

| 2002/0007236 | A1* | 1/2002 | Sadano | B62D 1/28 701/28 |
| 2008/0047775 | A1* | 2/2008 | Yamazaki | B62D 6/008 180/443 |
| 2008/0147276 | A1* | 6/2008 | Pattok | B62D 5/0472 701/42 |
| 2015/0344068 | A1* | 12/2015 | Taniguchi | B62D 6/003 701/41 |
| 2015/0353126 | A1* | 12/2015 | Chai | B62D 5/0463 701/42 |
| 2016/0101809 | A1* | 4/2016 | Hong | B62D 5/0463 701/43 |
| 2016/0107645 | A1* | 4/2016 | Okuda | G06K 9/00798 701/41 |
| 2018/0339725 | A1* | 11/2018 | Kodera | B62D 5/0421 |

FOREIGN PATENT DOCUMENTS

KR  10-2017-0114660 A  10/2017

* cited by examiner

*Primary Examiner* — Khoi H Tran
*Assistant Examiner* — Tristan J Greiner
(74) *Attorney, Agent, or Firm* — NSIP Law

(57) ABSTRACT

A motor-driven power steering apparatus includes an auxiliary output generation unit configured to generate an auxiliary output of a motor by using at least one of a vehicle speed, a steering angle and a column torque; a compensation gain generation unit configured to generate a compensation gain for compensating for a steering pull of a vehicle by a rapid acceleration during a turn, by using at least one of the vehicle speed, the steering angle and the column torque; and an auxiliary output compensation unit configured to compensate for an auxiliary output by applying the compensation gain outputted by the compensation gain generation unit to the auxiliary output.

18 Claims, 4 Drawing Sheets

MOTOR-DRIVEN POWER STEERING APPARATUS AND CONTROL METHOD THEREOF

CROSS-REFERENCE TO RELATED APPLICATION

The present application claims priority under 35 U.S.C. § 119(a) to Korean Patent Application No. 10-2018-0087061 filed on Jul. 26, 2018 in the Korean Intellectual Property Office, which is incorporated herein by reference in its entirety.

BACKGROUND

1. Technical Field

Embodiments of the disclosure relate to a motor-driven power steering apparatus and a control method thereof, and more particularly, to a motor-driven power steering apparatus and a control method thereof capable of compensating for a sense of heterogeneity felt by a driver on a steering wheel due to an instantaneous steering pull when a vehicle accelerates rapidly during a turn.

2. Related Art

The performance of a vehicle continues to increase, and particularly, a vehicle such as a high-performance electric car which is mounted with batteries on the rear part thereof may easily oversteer despite that it is a front-wheel-drive vehicle.

Moreover, as a general high-performance vehicle is applied with a high-output engine and a high-grip tire, when the vehicle rapidly accelerates during a turn, it is a frequent occurrence that the vehicle is instantaneously, rapidly and additionally pulled inwardly in a turning direction.

Due to this fact, differently from the will of a driver, a vehicle behavior may become unstable, driving stability may greatly deteriorate, and a sense of heterogeneous steering may be caused.

In order to solve these problems, a yaw rate sensor or a lateral acceleration sensor for a vehicle is used. However, due to a signal delay or noise of the yaw rate sensor or the lateral acceleration sensor, insufficiency may be caused in compensating for a sense of heterogeneity due to an instantaneous steering pull.

That is to say, in the conventional art in which oversteer is compensated for through a yaw rate sensor or a lateral acceleration sensor, problems may be caused in that substantially poor responsiveness may result due to an error (noise or the like) or a delay in the sensor itself, appropriate compensation may not be carried out due to the weight distribution or geometry of a vehicle and it may be difficult to accurately calculate a target yaw rate or lateral acceleration.

A background art of the disclosure is disclosed in Korean Unexamined Patent Publication No. 10-2017-0114660 (published on Oct. 16, 2017) entitled "Understeer/Oversteer Compensating Control Method of Vehicle."

SUMMARY

Various embodiments are directed to a motor-driven power steering apparatus and a control method thereof capable of compensating for a sense of heterogeneity felt by a driver on a steering wheel due to an instantaneous steering pull when a vehicle accelerates rapidly during a turn.

In an embodiment, a motor-driven power steering apparatus may include: an auxiliary output generation unit configured to generate an auxiliary output of a motor by using at least one of a vehicle speed, a steering angle and a column torque; a compensation gain generation unit configured to generate a compensation gain for compensating for a steering pull of a vehicle by a rapid acceleration during a turn, by using at least one of the vehicle speed, the steering angle and the column torque; and an auxiliary output compensation unit configured to compensate for an auxiliary output by applying the compensation gain outputted by the compensation gain generation unit to the auxiliary output.

The compensation gain generation unit may include a vehicle speed gain generating section configured to detect a vehicle speed variation, and generate a vehicle speed gain corresponding to the detected vehicle speed variation; a lateral acceleration gain generating section configured to calculate a lateral acceleration by using the vehicle speed and the steering angle, and generate a lateral acceleration gain corresponding to the calculated lateral acceleration; a steering angular velocity gain generating section configured to check whether a turning direction and a steering pull direction of the vehicle correspond to each other, by using the steering angle and a steering angular velocity, and generate a steering angular velocity gain corresponding to the steering angular velocity, depending on a checking result; a column torque gain generating section configured to generate a column torque gain corresponding to the column torque; and a compensation gain outputting section configured to generate the compensation gain through at least one of the vehicle speed gain, the lateral acceleration gain, the steering angular velocity gain and the column torque gain, and output the generated compensation gain.

The lateral acceleration gain generating section may include a lateral acceleration calculation part configured to calculate the lateral acceleration by using the vehicle speed and the steering angle; and a lateral acceleration gain detection part configured to detect the lateral acceleration gain corresponding to the lateral acceleration calculated by the lateral acceleration calculation part from a preset lookup table.

The lateral acceleration calculation part may calculate the lateral acceleration by using (vehicle speed)^2×(1/|steering angle|).

The steering angular velocity gain generating section may include a direction determination part configured to determine whether a direction of the steering angle and a direction of the steering angular velocity are the same; and a steering angular velocity gain detection part configured to detect the steering angular velocity gain depending on a determination result of the direction determination part.

The steering angular velocity gain detection part may detect the steering angular velocity gain when the direction of the steering angle and the direction of the steering angular velocity are the same as a determination result of the direction determination part.

The steering angular velocity gain detection part may set the steering angular velocity gain to 0 when the direction of the steering angle and the direction of the steering angular velocity are not the same as a determination result of the direction determination part.

The compensation gain outputting section may include a compensation gain calculation part configured to calculate the compensation gain by multiplying the vehicle speed gain, the lateral acceleration gain, the steering angular velocity gain and the column torque gain; and a compensation gain correction part configured to correct the compensation gain such that the auxiliary output of the auxiliary output generation unit is applied in a direction opposite to the steering pull direction of the vehicle.

In an embodiment, a motor-driven power steering apparatus may include: a vehicle speed gain generating section configured to detect a vehicle speed variation, and generate a vehicle speed gain corresponding to the detected vehicle speed variation; a lateral acceleration gain generating section configured to calculate a lateral acceleration by using a vehicle speed and a steering angle, and generate a lateral acceleration gain corresponding to the calculated lateral acceleration; a steering angular velocity gain generating section configured to check whether a turning direction and a steering pull direction of a vehicle correspond to each other, by using the steering angle and a steering angular velocity, and generate a steering angular velocity gain corresponding to the steering angular velocity, depending on a checking result; a column torque gain generating section configured to generate a column torque gain corresponding to a column torque; and a compensation gain outputting section configured to output a compensation gain for compensating for a steering pull of the vehicle by a rapid acceleration during a turn, by using at least one of the vehicle speed gain, the lateral acceleration gain, the steering angular velocity gain and the column torque gain.

The lateral acceleration gain generating section may include a lateral acceleration calculation part configured to calculate the lateral acceleration by using the vehicle speed and the steering angle; and a lateral acceleration gain detection part configured to detect the lateral acceleration gain corresponding to the lateral acceleration calculated by the lateral acceleration calculation part from a preset lookup table.

The lateral acceleration calculation part may calculate the lateral acceleration by using (vehicle speed)^2×(1/|steering angle|).

The steering angular velocity gain generating section may include a direction determination part configured to detect a sign of the steering angle and a sign of the steering angular velocity, and determine whether the detected sign of the steering angle and the detected sign of the steering angular velocity are the same; and a steering angular velocity gain detection part configured to detect the steering angular velocity gain when the sign of the steering angle and the sign of the steering angular velocity are the same as a determination result of the direction determination part, and set the steering angular velocity gain to 0 when the sign of the steering angle and the sign of the steering angular velocity are not the same as a determination result of the direction determination part.

The compensation gain outputting section may include a compensation gain calculation part configured to calculate the compensation gain by multiplying the vehicle speed gain, the lateral acceleration gain, the steering angular velocity gain and the column torque gain; and a compensation gain correction part configured to correct the compensation gain such that an auxiliary output of an auxiliary output generation unit is applied in a direction opposite to the steering pull direction of the vehicle.

In an embodiment, a method for controlling a motor-driven power steering apparatus may include: generating an auxiliary output of a motor by using at least one of a vehicle speed, a steering angle and a column torque; generating and outputting a compensation gain for compensating for a steering pull of a vehicle by a rapid acceleration during a turn, by using at least one of the vehicle speed, the steering angle and the column torque; and compensating for the auxiliary output by applying the compensation gain to the auxiliary output.

The outputting of the compensation gain may include detecting a vehicle speed variation, and generating a vehicle speed gain corresponding to the detected vehicle speed variation; calculating a lateral acceleration by using the vehicle speed and the steering angle, and generating a lateral acceleration gain corresponding to the calculated lateral acceleration; checking whether a turning direction and a steering pull direction of the vehicle correspond to each other, by using the steering angle and a steering angular velocity, and generating a steering angular velocity gain corresponding to the steering angular velocity, depending on a checking result; generating a column torque gain corresponding to the column torque; and generating and outputting the compensation gain by using at least one of the vehicle speed gain, the lateral acceleration gain, the steering angular velocity gain and the column torque gain.

The generating of the lateral acceleration gain may calculate the lateral acceleration by using the vehicle speed and the steering angle, and may detect the lateral acceleration gain corresponding to the calculated lateral acceleration from a preset lookup table.

The generating of the steering angular velocity gain may detect a sign of the steering angle and a sign of the steering angular velocity, may determine whether the detected sign of the steering angle and the detected sign of the steering angular velocity are the same, and may detect the steering angular velocity gain depending on a determination result.

The generating of the steering angular velocity gain may determine whether the sign of the steering angle and the sign of the steering angular velocity are the same, may detect the steering angular velocity gain when the sign of the steering angle and the sign of the steering angular velocity are the same as a determination result, and may set the steering angular velocity gain to 0 when the sign of the steering angle and the sign of the steering angular velocity are not the same as a determination result.

The generating and outputting of the compensation gain may calculate the compensation gain by multiplying the vehicle speed gain, the lateral acceleration gain, the steering angular velocity gain and the column torque gain, and may correct the compensation gain such that the auxiliary output is applied in a direction opposite to the steering pull direction of the vehicle.

In the motor-driven power steering apparatus and the control method thereof according to the embodiments of the disclosure, it is possible to compensate for a sense of heterogeneity felt by a driver on a steering wheel due to an instantaneous steering pull when a vehicle accelerates rapidly during a turn, thereby improving a steering feel and securing the safety of a driver.

Also, in the motor-driven power steering apparatus and the control method thereof according to the embodiments of the disclosure, since it is not necessary to change the geometry or structure of a vehicle, it is possible to solve a sense of heterogeneity felt by a driver on a steering wheel due to a rapid acceleration during a turn, without incurring an additional cost.

DETAILED DESCRIPTION

Figure 1:
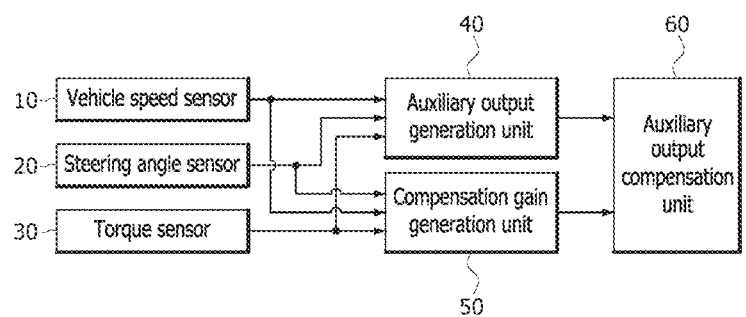
FIG. 1 is a block diagram illustrating a representation of an example of the configuration of a motor-driven power steering apparatus in accordance with an embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a motor-driven power steering apparatus and a control method thereof will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
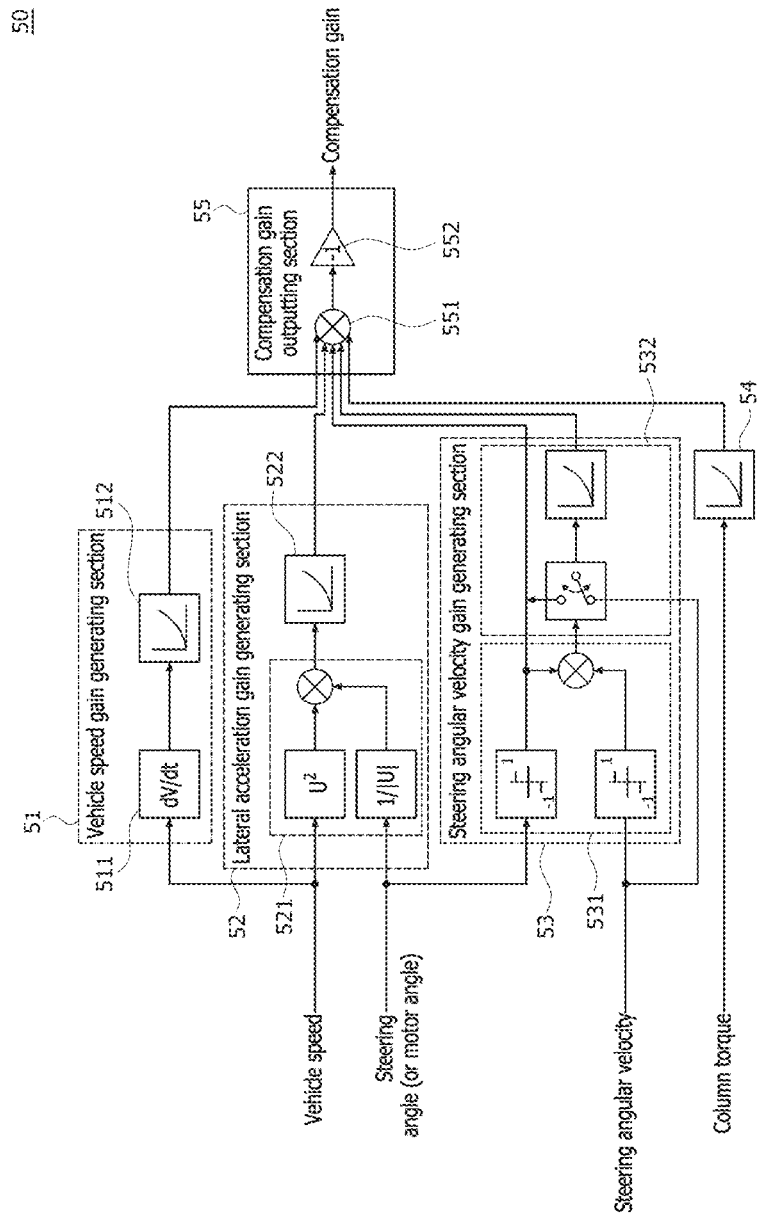
FIG. 2 is a block diagram illustrating a representation of an example of the configuration of a compensation gain generation unit in accordance with an embodiment.
Figure 3:
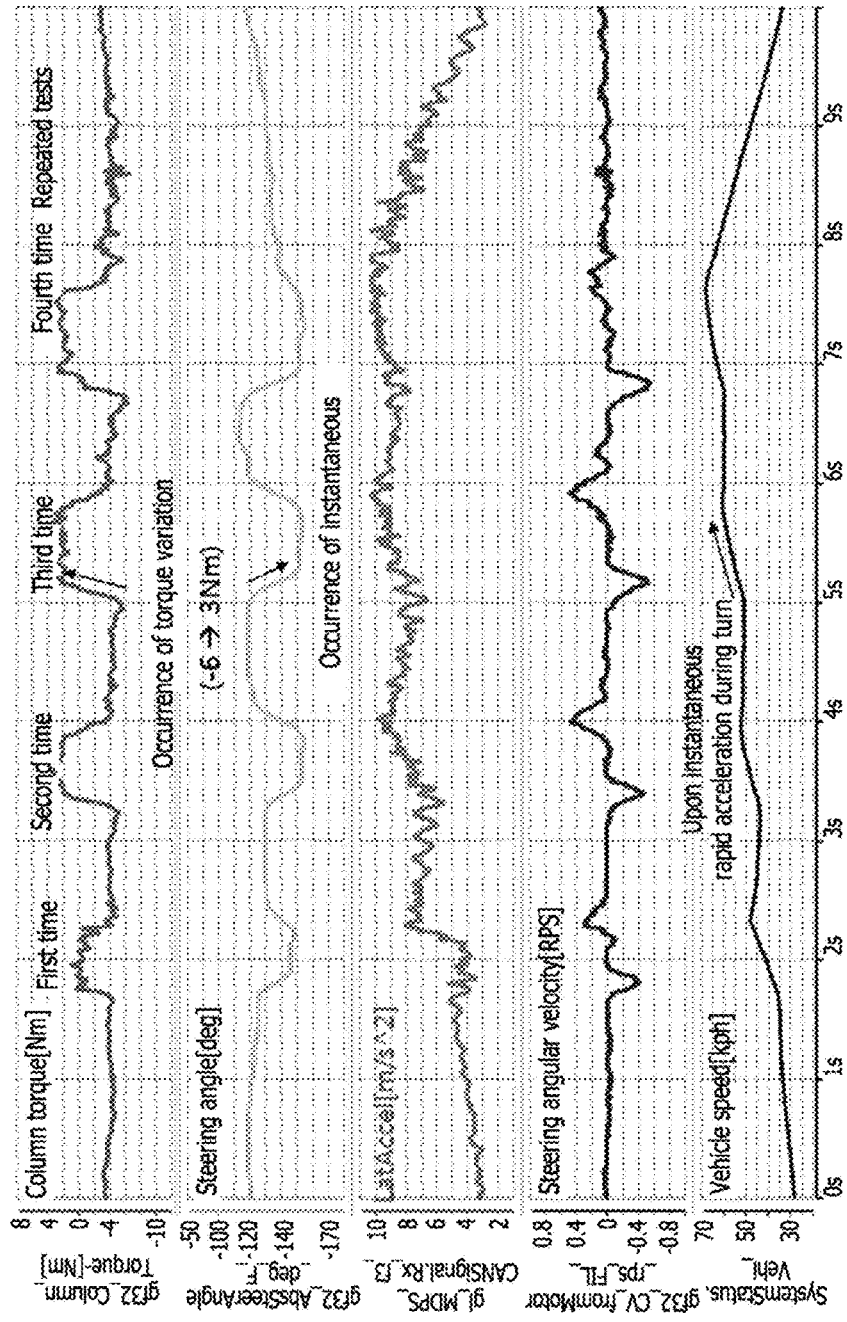
FIG. 3 is a representation of an example of a graph to assist in the explanation of a phenomenon in which a steering angle and a torque vary upon an instantaneous rapid acceleration during a turn.

FIG. 1 is a block diagram illustrating a representation of an example of the configuration of a motor-driven power steering apparatus in accordance with an embodiment, FIG. 2 is a block diagram illustrating a representation of an example of the configuration of a compensation gain generation unit in accordance with an embodiment, and FIG. 3 is a representation of an example of a graph to assist in the explanation of a phenomenon in which a steering angle and a torque vary upon an instantaneous rapid acceleration during a turn.

Referring to FIG. 1, the motor-driven power steering apparatus in accordance with the embodiment includes a vehicle speed sensor 10, a steering angle sensor 20, a torque sensor 30, an auxiliary output generation unit 40, a compensation gain generation unit 50, and an auxiliary output compensation unit 60.

The vehicle speed sensor 10 senses a vehicle speed of a running vehicle. As the vehicle speed sensor 10, all of various sensors such as a sensor which detects a vehicle speed using a rotation speed of a wheel, a sensor which detects a vehicle speed by measuring an rpm (revolutions per minute) of an engine and a sensor which detects a vehicle speed using a global positioning system (GPS) may be included.

The torque sensor 30 senses a column torque that is applied to a steering shaft as a driver steers a steering wheel.

The steering angle sensor 20 senses a steering angle and a steering angular velocity of the steering wheel. In other words, the steering angle sensor 20 including an optical sensor senses a steering angle, and detects a steering angular velocity by differentiating the steering angle with respect to time.

For reference, while a steering angle is described as an example in the embodiment, it is to be noted that a motor angle of an electric steering apparatus, for example, an MDPS (motor-driven power steering), may be applied in the same manner as a steering angle.

The auxiliary output generation unit 40 generates a target auxiliary output of the motor-driven power steering apparatus, that is, an auxiliary torque of an MDPS motor, by using a vehicle speed, a steering angle and a torque sensed through the vehicle speed sensor 10, the steering angle sensor 20 and the torque sensor 30.

The compensation gain generation unit 50 detects a lateral acceleration by using at least one of a vehicle speed, a steering angle and a column torque, and outputs a compensation gain for compensating for a steering pull of the vehicle by a rapid acceleration during a turn, based on the detected lateral acceleration.

Referring to FIGS. 2 and 3, the compensation gain generation unit 50 includes a vehicle speed gain generating section 51, a lateral acceleration gain generating section 52, a steering angular velocity gain generating section 53, a column torque gain generating section 54 and a compensation gain outputting section 55.

The vehicle speed gain generating section 51 detects a variation in vehicle speed, generates a vehicle speed gain corresponding to the detected variation in vehicle speed, and inputs the generated vehicle speed gain to the compensation gain outputting section 55.

The vehicle speed gain generating section 51 includes a vehicle speed variation calculation part 511 and a vehicle speed gain detection part 512.

The vehicle speed variation calculation part 511 calculates a vehicle speed variation by differentiating a vehicle speed sensed by the vehicle speed sensor 10 with respect to time.

The vehicle speed gain detection part 512 calculates a vehicle speed gain corresponding to the vehicle speed variation. In this case, the vehicle speed gain detection part 512 stores a lookup table in which vehicle speed gains corresponding to vehicle speed variations are set, and when a vehicle speed variation is calculated, detects a vehicle speed gain corresponding to the corresponding vehicle speed variation from the lookup table.

The lateral acceleration gain generating section 52 calculates a lateral acceleration by using a vehicle speed and a steering angle, and generates a lateral acceleration gain corresponding to the calculated lateral acceleration.

The lateral acceleration gain generating section 52 includes a lateral acceleration calculation part 521 and a lateral acceleration gain detection part 522.

The lateral acceleration calculation part 521 calculates a lateral acceleration by using a vehicle speed sensed by the vehicle speed sensor 10 and a steering angle sensed by the steering angle sensor 20. In this case, the lateral acceleration calculation part 521 calculates a lateral acceleration by multiplying a square value of the vehicle speed and a reciprocal of an absolute value of the steering angle. Since a lateral acceleration of a vehicle is (vehicle speed)^2/(turning radius), it may be calculated by an expression of (vehicle speed)^2×(1/|steering angle|).

In general, since the timing of a signal generated in a lateral acceleration sensor is too late due to noise and a delay to be immediately applied, insufficiency exists in compensating for a sense of heterogeneity induced due to a steering pull by a rapid acceleration during a turn. Therefore, by calculating a lateral acceleration through the expression of (vehicle speed)^2×(1/|steering angle|) and detecting a lateral acceleration gain based on the lateral acceleration, it is possible to compensate for a sense of heterogeneity induced due to a steering pull by a rapid acceleration during a turn.

The lateral acceleration gain detection part 522 detects a lateral acceleration gain corresponding to the lateral acceleration calculated by the lateral acceleration calculation part 521, and inputs the detected lateral acceleration gain to the compensation gain outputting section 55. Namely, the lateral acceleration gain detection part 522 stores in advance a lookup table in which lateral acceleration gains corresponding to lateral accelerations are set, and when a lateral acceleration is calculated by the lateral acceleration calculation part 521, detects a lateral acceleration gain corresponding to the lateral acceleration from the lookup table.

In this case, the lateral acceleration gain detection part 522 applies a lookup table in which a lateral acceleration of the vehicle calculated by the lateral acceleration calculation part 521 is taken as an x axis, and thereby, detects a lateral acceleration gain for the lateral acceleration. That is to say, a required basic force is derived based on a lateral force generated when a vehicle turns. At this time, in the case where the vehicle instantaneously and rapidly accelerates, for example, when a throttle valve is suddenly and largely opened, an engine RPM suddenly increases, a speed of a driving motor of an electric car suddenly increases or a vehicle speed suddenly increases, an additional steering pull (a phenomenon such as sudden oversteer) instantaneously occurs inwardly in a turning direction. Thus, by applying a lateral acceleration gain corresponding to a vehicle speed variation through the lookup table, a force required for rapid acceleration is derived.

The steering angular velocity gain generating section 53 checks whether a turning direction and a steering pull direction of the vehicle correspond to each other, by using a steering angle and a steering angular velocity, and generates a steering angular velocity gain corresponding to the steering angular velocity, depending on a checking result.

The steering angular velocity gain generating section 53 includes a direction determination part 531 and a steering angular velocity gain detection part 532.

In order to check whether a turning direction and a steering pull direction of the vehicle correspond to each other, the direction determination part 531 determines whether a steering angle and a steering angular velocity sensed by the steering angle sensor 20 are the same direction. In other words, when a steering angle and a steering angular velocity are sensed by the steering angle sensor 20, the direction determination part 531 detects a sign of the steering angle and a sign of the steering angular velocity, and determines whether the detected sign of the steering angle and the detected sign of the steering angular velocity are the same. The direction determination part 531 inputs '1' to the steering angular velocity gain detection part 532 when the sign of the steering angle and the sign of the steering angular velocity are the same, and inputs '−1' to the steering angular velocity gain detection part 532 when the sign of the steering angle and the sign of the steering angular velocity are not the same.

The steering angular velocity gain detection part 532 detects a steering angular velocity gain depending on a determination result of the direction determination part 531. In this case, the steering angular velocity gain detection part 532 detects a steering angular velocity gain corresponding to a steering angular velocity when a sign of a steering angle and a sign of the corresponding steering angular velocity are the same, and sets a steering angular velocity gain to '0' when a sign of a steering angle and a sign of a steering angular velocity are not the same. The steering angular velocity gain detection part 532 stores in advance a lookup table in which steering angular velocity gains corresponding to steering angular velocities are set, and when it is determined by the direction determination part 531 that a sign of a steering angle and a sign of a steering angular velocity are the same, detects a steering angular velocity gain corresponding to the steering angular velocity from the lookup table.

In general, if a vehicle rapidly accelerates during a turn, a steering pull occurs inwardly in a direction in which the vehicle turns, and at this time, a steering angular velocity corresponds to a steering angle direction (sign). Namely, a steering angular velocity is largely induced when a steering pull occurs, and a compensation gain should be applied only in the case where a direction of a steering angle in which the steering pull occurs and a direction of a steering angular velocity correspond to each other. This is because the compensation gain is to compensate for an abnormal steering pull characteristic of the vehicle and is not to exert an influence on a driver's steering will. That is to say, the case where a turning direction and an additional steering pull of the vehicle are the same direction is attributable to a characteristic of the vehicle and requires compensation, but the case where a steering angular velocity is an opposite direction when the vehicle rapidly accelerates during a turn means that the driver steers the vehicle in the opposite direction with a steering will and thus does not require application of a compensation gain.

To this end, the direction determination part 531 determines that a sign of a steering angle and a sign of a steering angular velocity are the same direction (that is, attributable to a characteristic of the vehicle) in the case where a product thereof is 1, and determines that a sign of a steering angle and a sign of a steering angular velocity are opposite to each other (that is, attributable to a driver's steering will) in the case where a product thereof is −1. As a result of the determination, only in the case where a product is 1, the steering angular velocity gain detection part 532 applies a steering angular velocity gain corresponding to a steering angular velocity to finally apply a compensation gain.

The column torque gain generating section 54 generates, when a column torque is sensed by the torque sensor 30, a column torque gain corresponding to the column torque. The column torque gain generating section 54 stores in advance a lookup table in which column torque gains corresponding to column torques are set, and when a column torque is sensed by the torque sensor 30, detects a column torque gain corresponding to the column torque from the lookup table.

In general, a column torque is generated during a turn, and in order to overcome a lateral force, the motor-driven power steering apparatus needs to output an auxiliary output. In this case, the corresponding auxiliary output varies depending on a size and a characteristic of a vehicle, and an optimized column torque gain is detected by applying a lookup table as to how much a compensation gain is to be applied. The column torque gain generating section 54 detects a column torque gain corresponding to a column torque, and inputs the detected column torque gain to the compensation gain outputting section 55.

The compensation gain outputting section 55 generates a compensation gain by using a vehicle speed gain, a lateral acceleration gain, a steering angular velocity gain and a column torque gain.

The compensation gain outputting section 55 includes a compensation gain calculation part 551 and a compensation gain correction part 552.

The compensation gain calculation part 551 calculates a compensation gain by multiplying a vehicle speed gain, a lateral acceleration gain, a steering angular velocity gain and a column torque gain.

The compensation gain correction part 552 corrects a compensation gain which is calculated by the compensation gain calculation part 551, such that an auxiliary output is applied in a direction opposite to a steering pull direction of the vehicle. That is to say, in order to prevent an additional steering pull upon a rapid acceleration in a direction in which the vehicle currently turns, an auxiliary output should be applied in a direction opposite to a steering pull direction. Accordingly, the compensation gain correction part 552 multiplies a compensation gain by −1 before outputting the compensation gain such that the corresponding compensation gain may be applied to an auxiliary output, causes the auxiliary output to be applied in a direction opposite to a steering pull direction upon a rapid acceleration during a turn, and through this, prevents an additional steering pull of the vehicle.

The auxiliary output compensation unit 60 compensates for an auxiliary output by applying a compensation gain outputted by the compensation gain generation unit 50 to an auxiliary output generated by the auxiliary output generation unit 40.

In other words, the auxiliary output compensation unit 60 outputs an output by multiplying the compensation gain outputted by the compensation gain generation unit 50 to the auxiliary output generated by the auxiliary output generation unit 40, and thereby, compensates for a sense of heterogeneity felt by the driver on a steering wheel due to an instantaneous steering pull when the vehicle rapidly accelerates during a turn and improves a steering feel.

Hereafter, a method for controlling a motor-driven power steering apparatus in accordance with an embodiment will be described with reference to FIG. 4.

Figure 4:
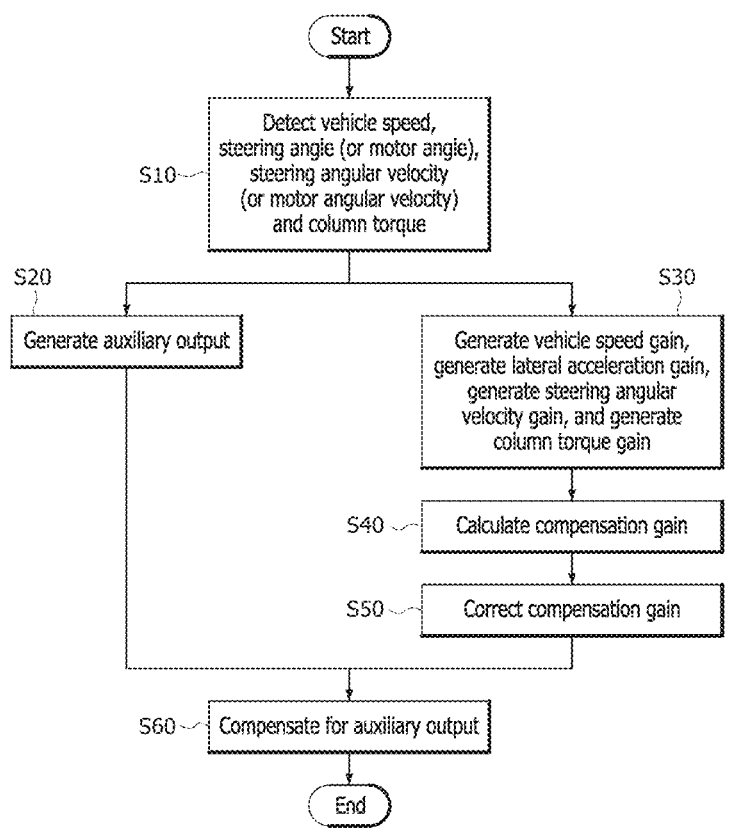
FIG. 4 is a representation of an example of a flow chart to assist in the explanation of a method for controlling a motor-driven power steering apparatus in accordance with an embodiment.

FIG. 4 is a representation of an example of a flow chart to assist in the explanation of a method for controlling a motor-driven power steering apparatus in accordance with an embodiment.

Referring to FIG. 4, first, the vehicle speed sensor 10 senses a vehicle speed of the running vehicle, the torque sensor 30 senses a column torque, and the steering angle sensor 20 senses a steering angle and a steering angular velocity of a steering wheel (S10).

As the vehicle speed, the steering angle and the column torque are sensed by the vehicle speed sensor 10, the steering angle sensor 20 and the torque sensor 30, respectively, the auxiliary output generation unit 40 generates a target auxiliary output of the motor-driven power steering apparatus by using the vehicle speed, the steering angle and the column torque (S20).

The compensation gain generation unit 50 detects a lateral acceleration by using at least one of the vehicle speed, the steering angle and the column torque, and generates a vehicle speed gain, a lateral acceleration gain, a steering angular velocity gain and a column torque gain for compensating for a steering pull of the vehicle by a rapid acceleration during a turn, based on the detected lateral acceleration (S30).

That is to say, the vehicle speed gain generating section 51 calculates a vehicle speed variation by differentiating the vehicle speed sensed by the vehicle speed sensor 10 with respect to time, and detects a vehicle speed gain corresponding to the vehicle speed variation from a lookup table.

The lateral acceleration gain generating section 52 calculates a lateral acceleration by using the vehicle speed sensed by the vehicle speed sensor 10 and the steering angle sensed by the steering angle sensor 20, and detects a lateral acceleration gain corresponding to the calculated lateral acceleration from a lookup table.

The steering angular velocity gain generating section 53 checks whether a turning direction and a steering pull direction of the vehicle correspond to each other, by using the steering angle and the steering angular velocity, and generates a steering angular velocity gain corresponding to the steering angular velocity, depending on a checking result. In this case, a steering angular velocity gain is detected depending on a checking result on whether a turning direction and a steering pull direction of the vehicle correspond to each other. The steering angular velocity gain generating section 53 detects a steering angular velocity gain corresponding to the corresponding steering angular velocity from a lookup table when the turning direction and the steering pull direction of the vehicle correspond to each other, and sets a steering angular velocity gain to '0' when the turning direction and the steering pull direction of the vehicle do not correspond to each other.

The column torque gain generating section 54 detects, when the column torque is sensed by the torque sensor 30, a column torque gain corresponding to the column torque from a lookup table.

When the vehicle speed gain, the lateral acceleration gain, the steering angular velocity gain and the column torque gain are detected as described above, the compensation gain generation unit 50 calculates a compensation gain by using the vehicle speed gain, the lateral acceleration gain, the steering angular velocity gain and the column torque gain (S40), and corrects the compensation gain such that an auxiliary output is applied in a direction opposite to a steering pull direction of the vehicle (S50).

The auxiliary output compensation unit 60 compensates for an auxiliary output by applying the compensation gain outputted by the compensation gain generation unit 50 to the auxiliary output generated by the auxiliary output generation unit 40 (S60). In other words, the auxiliary output compensation unit 60 outputs an output by multiplying the compensation gain outputted by the compensation gain generation unit 50 to the auxiliary output generated by the auxiliary output generation unit 40, and thereby, compensates for a sense of heterogeneity felt by the driver on a steering wheel due to an instantaneous steering pull when the vehicle rapidly accelerates during a turn and improves a steering feel.

As is apparent from the above descriptions, in the motor-driven power steering apparatus and the control method thereof according to the embodiments of the disclosure, it is possible to compensate for a sense of heterogeneity felt by a driver on a steering wheel due to an instantaneous steering pull when a vehicle accelerates rapidly during a turn, thereby improving a steering feel and securing the safety of a driver.

Also, in the motor-driven power steering apparatus and the control method thereof according to the embodiments of the disclosure, since it is not necessary to change the geometry or structure of a vehicle, it is possible to solve a sense of heterogeneity felt by a driver on a steering wheel due to a rapid acceleration during a turn, without incurring an additional cost.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A motor-driven power steering apparatus comprising:
   an auxiliary output generator configured to generate an auxiliary output of a motor by using any one or any combination of any two or more of a vehicle speed, a steering angle, and a column torque;
   a compensation gain generator configured to calculate a lateral acceleration by using (vehicle speed)$^2$×(1/|steering angle|), and generate a compensation gain for compensating for a steering pull of a vehicle by a rapid acceleration during a turn, by using any one or any combination of any two or more of the vehicle speed, the steering angle, the calculated lateral acceleration, and the column torque; and
   an auxiliary output compensator configured to compensate for the auxiliary output by applying the compensation gain outputted by the compensation gain generator to the auxiliary output.

2. The motor-driven power steering apparatus of claim 1, wherein the compensation gain generator comprises:
   a vehicle speed gain generator configured to detect a vehicle speed variation, and generate a vehicle speed gain corresponding to the detected vehicle speed variation;
   a lateral acceleration gain generator configured to calculate the lateral acceleration, and generate a lateral acceleration gain corresponding to the calculated lateral acceleration;
   a steering angular velocity gain generator configured to check whether a turning direction and a steering pull direction of the vehicle correspond to each other, by using the steering angle and a steering angular velocity, and generate a steering angular velocity gain corresponding to the steering angular velocity, depending on a result of the checking;
   a column torque gain generator configured to generate a column torque gain corresponding to the column torque; and
   a compensation gain outputter configured to generate the compensation gain through any one or any combination of any two or more of the vehicle speed gain, the lateral acceleration gain, the steering angular velocity gain, and the column torque gain, and output the generated compensation gain.

3. The motor-driven power steering apparatus of claim 2, wherein the lateral acceleration gain generator comprises:
   a lateral acceleration calculator configured to calculate the lateral acceleration; and
   a lateral acceleration gain detector configured to detect the lateral acceleration gain corresponding to the lateral acceleration calculated by the lateral acceleration calculator from a preset lookup table.

4. The motor-driven power steering apparatus of claim 2, wherein the steering angular velocity gain generator comprises:
   a direction determiner configured to determine whether a direction of the steering angle and a direction of the steering angular velocity are the same; and
   a steering angular velocity gain detector configured to detect the steering angular velocity gain depending on a determination result of the direction determiner.

5. The motor-driven power steering apparatus of claim 4, wherein the steering angular velocity gain detector is further configured to detect the steering angular velocity gain, in response to the direction of the steering angle and the direction of the steering angular velocity being the same as the determination result of the direction determiner.

6. The motor-driven power steering apparatus of claim 4, wherein the steering angular velocity gain detector is further configured to set the steering angular velocity gain to 0, in response to the direction of the steering angle and the direction of the steering angular velocity not being the same as the determination result of the direction determiner.

7. The motor-driven power steering apparatus of claim 2, wherein the compensation gain outputter comprises:
   a compensation gain calculator configured to calculate the compensation gain by multiplying the vehicle speed gain, the lateral acceleration gain, the steering angular velocity gain and the column torque gain; and
   a compensation gain corrector configured to correct the compensation gain such that the auxiliary output of the auxiliary output generator is applied in a direction opposite to the steering pull direction of the vehicle.

8. A motor-driven power steering apparatus comprising:
   a vehicle speed gain generator configured to detect a vehicle speed variation, and generate a vehicle speed gain corresponding to the detected vehicle speed variation;
   a lateral acceleration gain generator configured to calculate a lateral acceleration by using (vehicle speed)^2× (1/|steering angle|), and generate a lateral acceleration gain corresponding to the calculated lateral acceleration;
   a steering angular velocity gain generator configured to check whether a turning direction and a steering pull direction of a vehicle correspond to each other, by using the steering angle and a steering angular velocity, and generate a steering angular velocity gain corresponding to the steering angular velocity, depending on a result of the checking;
   a column torque gain generator configured to generate a column torque gain corresponding to a column torque; and
   a compensation gain outputter configured to output a compensation gain for compensating for a steering pull of the vehicle by a rapid acceleration during a turn, by using any one or any combination of any two or more of the vehicle speed gain, the lateral acceleration gain, the steering angular velocity gain, and the column torque gain.

9. The motor-driven power steering apparatus of claim 8, wherein the lateral acceleration gain generator comprises:
   a lateral acceleration calculator configured to calculate the lateral acceleration; and
   a lateral acceleration gain detector configured to detect the lateral acceleration gain corresponding to the lateral acceleration calculated by the lateral acceleration calculator from a preset lookup table.

10. The motor-driven power steering apparatus of claim 8, wherein the steering angular velocity gain generator comprises:
    a direction determiner configured to detect a sign of the steering angle and a sign of the steering angular velocity, and determine whether the detected sign of the steering angle and the detected sign of the steering angular velocity are the same; and
    a steering angular velocity gain detector configured to detect the steering angular velocity gain in response to the detected sign of the steering angle and the detected sign of the steering angular velocity being the same as a determination result of the direction determiner, and set the steering angular velocity gain to 0 in response to the detected sign of the steering angle and the detected sign of the steering angular velocity not being the same as the determination result of the direction determiner.

11. The motor-driven power steering apparatus of claim 8, wherein the compensation gain outputter comprises:
    a compensation gain calculator configured to calculate the compensation gain by multiplying the vehicle speed gain, the lateral acceleration gain, the steering angular velocity gain, and the column torque gain; and
    a compensation gain corrector configured to correct the compensation gain such that an auxiliary output of an auxiliary output generator is applied in a direction opposite to the steering pull direction of the vehicle.

12. A method for controlling a motor-driven power steering apparatus, comprising:
    generating an auxiliary output of a motor by using any one or any combination of any two or more of a vehicle speed, a steering angle, and a column torque;
    calculating a lateral acceleration by using (vehicle speed)^2×(1/|steering angle|);
    generating and outputting a compensation gain for compensating for a steering pull of a vehicle by a rapid acceleration during a turn, by using any one or any combination of any two or more of the vehicle speed, the steering angle, the calculated lateral acceleration, and the column torque; and
    compensating for the auxiliary output by applying the compensation gain to the auxiliary output.

13. The method of claim 12, wherein the generating and outputting of the compensation gain comprises:
    detecting a vehicle speed variation, and generating a vehicle speed gain corresponding to the detected vehicle speed variation;
    generating a lateral acceleration gain corresponding to the calculated lateral acceleration;
    checking whether a turning direction and a steering pull direction of the vehicle correspond to each other, by using the steering angle and a steering angular velocity, and generating a steering angular velocity gain corresponding to the steering angular velocity, depending on a result of the checking;
    generating a column torque gain corresponding to the column torque; and
    generating and outputting the compensation gain by using any one or any combination of any two or more of the vehicle speed gain, the lateral acceleration gain, the steering angular velocity gain, and the column torque gain.

14. The method of claim 13, wherein the generating of the lateral acceleration gain comprises detecting the lateral acceleration gain corresponding to the calculated lateral acceleration from a preset lookup table.

15. The method of claim 13, wherein the generating of the steering angular velocity gain comprises detecting a sign of the steering angle and a sign of the steering angular velocity, determining whether the detected sign of the steering angle and the detected sign of the steering angular velocity are the same, and detecting the steering angular velocity gain depending on a result of the determining.

16. The method of claim 15, wherein the generating of the steering angular velocity gain further comprises detecting the steering angular velocity gain, in response to the result of the determining being the detected sign of the steering angle and the detected sign of the steering angular velocity are the same, and setting the steering angular velocity gain to 0, in response to the result of the determining being that the detected sign of the steering angle and the detected sign of the steering angular velocity not the same as.

17. The method of claim 13, wherein the generating and outputting of the compensation gain comprises calculating the compensation gain by multiplying the vehicle speed gain, the lateral acceleration gain, the steering angular velocity gain, and the column torque gain, and correcting the compensation gain such that the auxiliary output is applied in a direction opposite to the steering pull direction of the vehicle.

18. The motor-driven power steering apparatus of claim 1, wherein the compensation gain generator is further configured generate the compensation gain based on a vehicle speed gain corresponding to a calculated variation in the vehicle speed, and further based on a lateral acceleration gain corresponding to the calculated lateral acceleration,
  wherein the vehicle speed gain is selected from vehicle speed gains stored in a lookup table with corresponding vehicle speed variations, and
  wherein the lateral acceleration gain is selected from lateral acceleration gains stored in another lookup table with corresponding lateral accelerations.

* * * * *